US010252667B2

(12) United States Patent
Ben Abdelaziz

(10) Patent No.: US 10,252,667 B2
(45) Date of Patent: Apr. 9, 2019

(54) VEHICLE TRIM ASSEMBLY COMPRISING A STORAGE COMPARTMENT AND A SHUTTER

(71) Applicant: Faurecia Interieur Industrie, Nanterre (FR)

(72) Inventor: Omar Ben Abdelaziz, Beauvais (FR)

(73) Assignee: Faurecia Interieur Industrie, Nanterre (FR)

( * ) Notice: Subject to any disclaimer, the term of this patent is extended or adjusted under 35 U.S.C. 154(b) by 83 days.

(21) Appl. No.: 15/442,494

(22) Filed: Feb. 24, 2017

(65) Prior Publication Data

US 2017/0246989 A1   Aug. 31, 2017

(30) Foreign Application Priority Data

Feb. 26, 2016   (FR) ..................................... 16 51614

(51) Int. Cl.
| | |
|---|---|
| *B60R 13/00* | (2006.01) |
| *B60Q 3/74* | (2017.01) |
| *B60Q 3/20* | (2017.01) |
| *B60N 3/10* | (2006.01) |
| *B60R 7/04* | (2006.01) |

(Continued)

(52) U.S. Cl.
CPC .............. *B60Q 3/745* (2017.02); *B60N 3/101* (2013.01); *B60Q 3/20* (2017.02); *B60Q 3/225* (2017.02); *B60R 7/04* (2013.01); *H05B 33/04* (2013.01); *H05B 33/08* (2013.01); *H05B 33/12* (2013.01)

(58) Field of Classification Search
CPC .......... B60Q 3/745; B60Q 3/225; B60Q 3/20; B60N 3/101; B60R 7/04; H05B 33/04; H05B 33/08; H05B 33/12
See application file for complete search history.

(56) References Cited

U.S. PATENT DOCUMENTS

| | | |
|---|---|---|
| 7,475,954 B1 | 1/2009 | Latunski |
| 8,925,616 B2 * | 1/2015 | Ganz ........................ B60N 3/08 160/231.2 |

(Continued)

FOREIGN PATENT DOCUMENTS

| | | | |
|---|---|---|---|
| EP | 1600330 A1 * | 11/2005 | ............... B60R 7/04 |
| FR | 3022509 A1 | 12/2015 | |

(Continued)

OTHER PUBLICATIONS

French Search Report in French for application No. FR1651614, dated Sep. 21, 2016, 2 pages.

*Primary Examiner* — Lori L Lyjak
(74) *Attorney, Agent, or Firm* — Reising Ethington P.C.

(57) ABSTRACT

A vehicle trim assembly (2), comprising: a storage compartment (6) defining a storage space (8) emerging through an opening (26); and a shutter (10) moving relative to the storage compartment between a closing position, in which it closes off the opening, and an open position, in which it is freed from the opening. The shutter (10) comprises at least one transmission zone (50) able to be steered between a viewing configuration, in which the transmission zone allows the visible light to pass through the shutter and makes it possible to distinguish the contents of the storage space through the shutter, and a concealing position, in which the transmission zone does not make it possible to distinguish the contents of the storage space through the shutter.

10 Claims, 2 Drawing Sheets

(51) Int. Cl.
  *H05B 33/04* (2006.01)
  *H05B 33/08* (2006.01)
  *H05B 33/12* (2006.01)
  *B60Q 3/225* (2017.01)

(56) References Cited

U.S. PATENT DOCUMENTS

2014/0312084 A1* 10/2014 Kuhn .................. B60R 7/04
                                            224/400
2015/0075733 A1* 3/2015 Piccin .................. B32B 27/40
                                            160/323.1

FOREIGN PATENT DOCUMENTS

| GB | 2503337 A | 12/2013 |
| JP | 2014213632 A | 11/2014 |

* cited by examiner

VEHICLE TRIM ASSEMBLY COMPRISING A STORAGE COMPARTMENT AND A SHUTTER

TECHNICAL FIELD

The present invention relates to a vehicle trim assembly comprising:
- a storage compartment defining a storage space emerging through an opening;
- a shutter movable relative to the storage compartment between a closing position, in which it closes off the opening, and an open position, in which it is freed from the opening.

It is known to close off a storage space using a shutter that can be retracted so as to be able to access the storage space. Such a shutter is for example provided to close the storage space of a vehicle center console, in particular in a motor vehicle. The user must then move the shutter toward the open position to access the contents of the storage compartment.

GB 2,503,337 describes a trim assembly comprising a camera filming the inside of a storage compartment and a screen covering the storage compartment displaying the image of the inside of the compartment. However, such a trim assembly is not very practical, the field of view of the camera being able to be obstructed by an object present in the compartment.

SUMMARY

One aim of the invention is to propose a trim assembly that makes it possible to obtain information about the contents of the storage compartment simply and efficiently.

To that end, the invention proposes a trim assembly of the aforementioned type, characterized in that the shutter comprises at least one transmission zone controllable between a viewing configuration, in which the transmission zone allows the visible light to pass through the shutter and makes it possible to distinguish the contents of the storage space through the shutter, and a concealing position, in which the transmission zone does not make it possible to distinguish the contents of the storage space through the shutter.

According to other embodiments, the trim assembly comprises one or more of the following features, considered alone or according to any technically possible combination(s):
- the shutter comprises an electroluminescent screen extending in the transmission zone, the screen being at least partially transparent or translucent when it is not generating light;
- the shutter comprises a transparent protective layer covering the screen;
- the screen is a touch-sensitive screen;
- the transmission zone has an adjustable optical transmittance;
- the shutter comprises an adjustable-transmittance film extending in the transmission zone;
- the transmission zone has a higher optical transmittance in the viewing configuration than in the concealing configuration;
- the transmission zone is transparent or translucent in the viewing configuration;
- the transmission zone is opaque in the concealing configuration;
- the trim essentially comprises a control device to control the transmission zone in order to activate the change of configuration, in particular based on the actuation of a control button and/or a signal provided by a sensor;
- the transmission zone emits light;
- the screen is able to display images;
- the protective layer and the screen are assembled using a transparent adhesive;
- the transmission zone generates less light in the viewing configuration than in the concealing configuration.

The invention also relates to a shutter intended to be mounted movably relative to a storage compartment between a closing position, in which it closes off the opening of the storage compartment, and an open position, in which it is freed from the opening, the shutter comprising at least one transmission zone controllable between a viewing configuration, in which the transmission zone allows the visible light to pass through the shutter and makes it possible to distinguish the contents of the storage space through the shutter, and a concealing position, in which the transmission zone does not make it possible to distinguish the contents of the storage space through the shutter.

BRIEF DESCRIPTION OF THE DRAWINGS

The invention and its advantages will be better understood upon reading the following description, provided solely as an example, and done in reference to the appended drawings, in which.

DETAILED DESCRIPTION

Hereinafter, the "visible" light refers to the light situated in the visible domain, i.e., made up of electromagnetic waves having a wavelength comprised between about 380 nanometers and 780 nanometers.

Hereinafter, the term "transparent" refers to a body transmitting light by refraction and through which objects are clearly visible. The term "opaque" refers to an object that does not allow light to pass. The term "translucent" refers to a body transmitting light diffusely without making it possible to distinguish the objects clearly. "Distinguish" refers to the possibility of identifying the outlines of objects or the details of objects.

Figure 1:
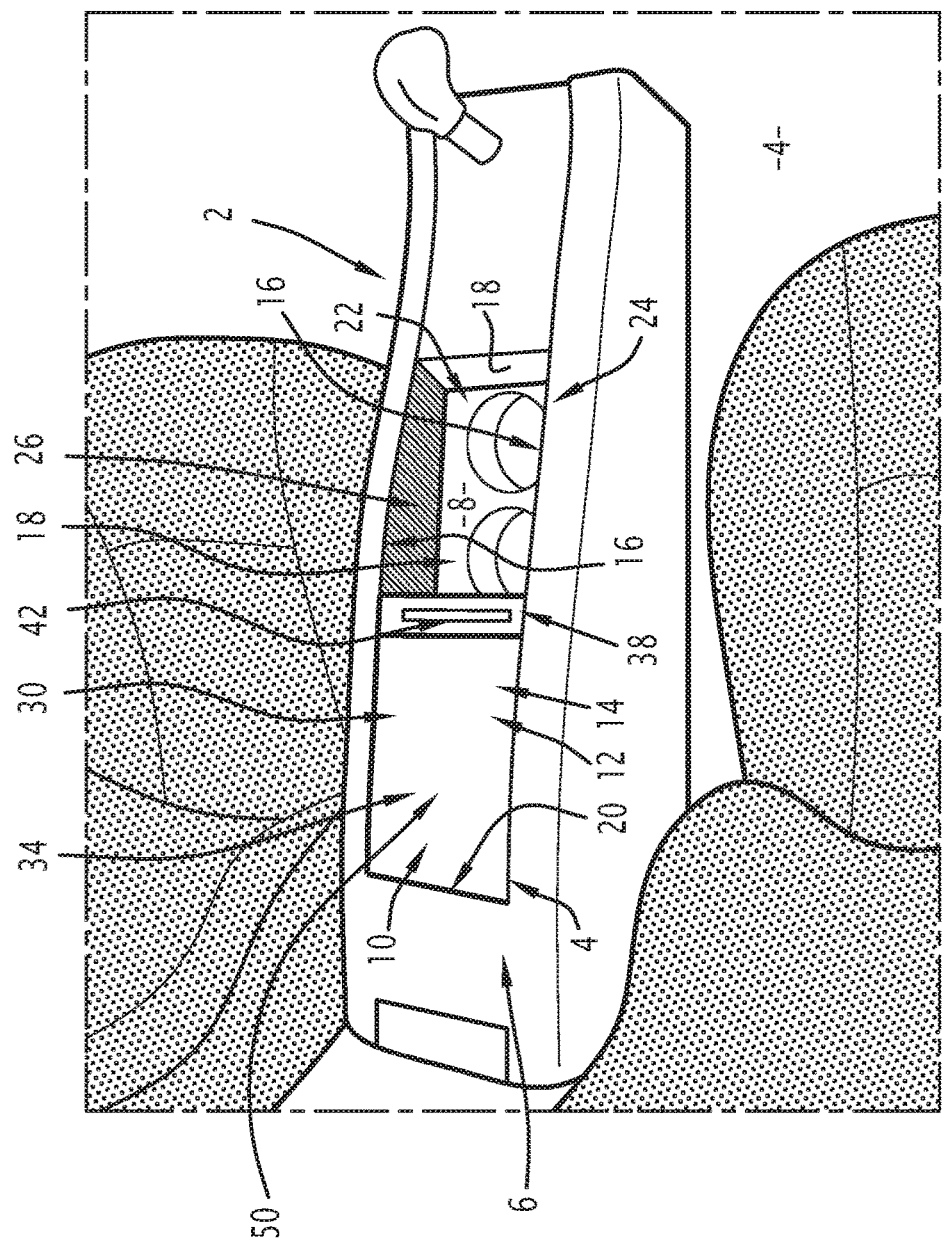
FIG. 1 is a diagrammatic exploded perspective view of a trim assembly comprising a shutter.

The trim assembly 2 of FIG. 1 is intended to be arranged in a vehicle, in particular a motor vehicle, and accessible from a passenger compartment 4 inside the vehicle intended to receive passengers.

The vehicle trim assembly 2 comprises a storage compartment 6, defining a storage space 8, and a moving shutter 10 making it possible to close off the storage compartment 6.

The shutter 10 comprises at least one transmission zone 50 controllable between a viewing configuration, in which the transmission zone 50 allows the visible light to pass through the shutter 10 and makes it possible to distinguish the contents of the storage space through the shutter 10, and a concealing position, in which the transmission zone 50 does not make it possible to distinguish the contents of the storage space 8 through the shutter 10.

In one embodiment, in the viewing configuration, the transmission zone 50 of the shutter 10 is transparent or translucent.

In one embodiment, in the concealing configuration, the transmission zone 50 of the shutter 10 is opaque.

Figure 2:
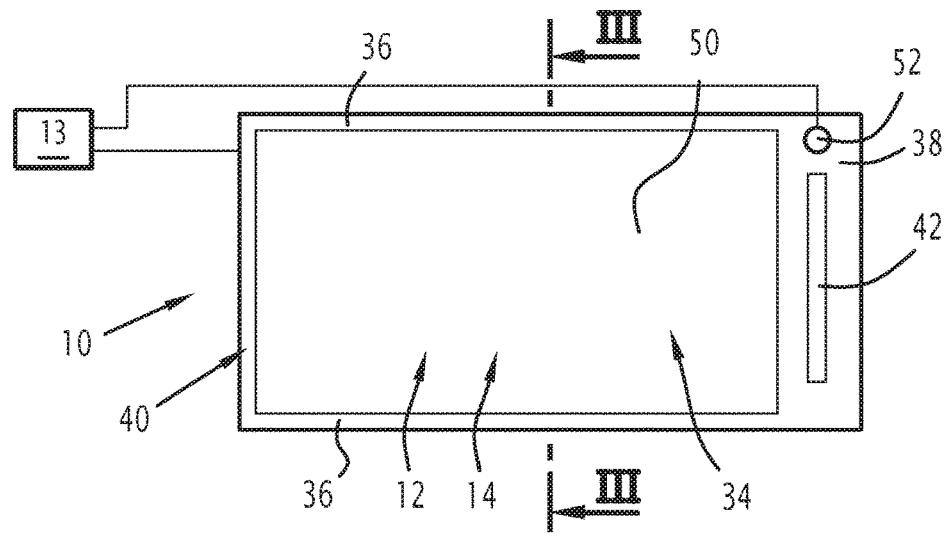
FIG. 2 is a top view of the shutter of the trim assembly of FIG. 1.
Figure 3:
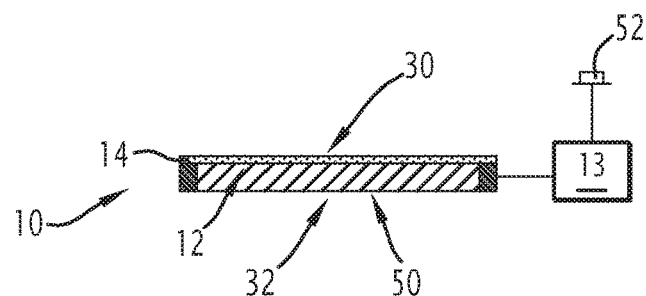
FIG. 3 is a sectional view of the shutter of the trim assembly along III-III of FIG. 2.

In the example shown in FIGS. 1 to 3, the shutter 10 comprises two superimposed layers: an electroluminescent screen 12 and a protective layer 14 for the screen 12.

Advantageously, the trim assembly 2 further comprises an electronic control device 13 able to control the change of configuration of the transmission zone 50. The control device 13 is able to place the transmission zone 50 selectively in the viewing configuration or in the concealing configuration.

Furthermore, the control device 13 is advantageously able to exchange data with other electronic systems on board the vehicle. For example, the control device 13 is able to receive information to be displayed on the screen 12 and to command the screen 12 to display this information 12.

The trim assembly 2 as shown in FIG. 2 is a vehicle center console, positioned between the two front seats of the vehicle. Alternatively, the trim assembly 2 is a glovebox or another piece of interior equipment of the vehicle comprising a storage compartment 6 that can be closed by a shutter 10.

The storage compartment 6 has two opposite side walls 16, a front wall 18 and a rear wall 20 opposite the front wall 18, a bottom wall 22 and a rim 24 opposite the bottom wall 22. The walls 16, 18, 20, 22 define the storage space 8 between them. The storage space 8 emerges in the passenger compartment 4 through an opening 26 defined by the rim 24. The opening 26 is positioned substantially across from the bottom wall 22. The storage compartment 6 is able to receive and store objects inserted through the opening 26 in the storage space 8. The stored objects are for example electronic devices, such as a GPS guidance device or a telephone, or non-electronic objects such as keys, etc.

The shutter 10 moves relative to the storage compartment 6 between an open position, in which it is freed from the opening 26, and a closed position, in which it closes off the opening 26. The shutter 10 is shown in FIG. 1 in an intermediate position between the open position and the closed position.

The shutter 10 has a first face 30 and an opposite second face 32. It has a thickness taken between the first face 30 and the second face 32. The first face 30 includes a part 34 designed to be visible from the passenger compartment 4. The second face 32 is turned across from the storage space 8.

The shutter 10 has two longitudinal edges 36 intended to be respectively placed along the side walls 16 of the compartment 6 and two transverse edges 38, 40.

The longitudinal edges 36 and the rear transverse edge 40 of the shutter 10 are advantageously hidden by the rim 24 when the shutter 10 is in the open position, the closed position or the intermediate positions.

The thickness of the shutter 10 is relatively small with respect to its longitudinal and transverse dimensions. The shutter 10 thus advantageously has a thickness smaller than 8 mm, and is for example comprised between 1 mm and 5 mm.

The shutter 10 is flexible so as to be able to be bent when it moves between closed position and the open position. Due to its flexibility, the shutter 10 can be bent without irreversible deformation. However, the shutter 10 is rigid enough not to bend under its own weight and remains substantially flat, through the opening 26, when it is in the closed position.

The shutter 10 is mounted sliding longitudinally relative to the storage compartment 6.

The storage compartment 6 for example includes two parallel guide rails for the shutter 10, and the shutter 10 is mounted sliding in the rails. Each rail comprises a first portion extending along a respective side wall 16 near the opening 26 and a second portion extending on the rear wall 18 from the first portion. Each longitudinal edge 36 cooperates with a respective guide rail to allow the shutter 10 to slide. The shutter 10 slides along a sliding line that is curved such that it bends.

The shutter 10 includes a gripping element 42, such as handle, designed to facilitate the movement of the shutter 10 between its open position and its closed position by a user. The gripping element 42 is positioned on the first face 30, and preferably near the front transverse edge 38 of the shutter 10.

In the closed position, the shutter 10 is substantially planar. The longitudinal and transverse dimensions of the shutter 10 are suitable for closing off the opening 26 when the shutter 10 is in the closed position.

When the shutter 10 is in the closed position, the storage space 8 is inaccessible from the passenger compartment 4. It prevents objects from being removed from the compartment 6 and prevents dust from entering the compartment 6. Furthermore, when the shutter 10 is in the viewing configuration, the contents of the compartment 6 remain visible through the shutter 10, as will be described later.

When the shutter 10 is in the open position, the storage space 8 is accessible from the passenger compartment 4. In the open position, part of the shutter 10 is for example retracted away from the opening 26, by winding into a small storage space, such a space for example extending along the rear wall 20 of the storage compartment 6.

The screen 12 is placed in the part 34 of the shutter 10 intended to be visible. Advantageously, the entire surface of the screen 12 is oriented toward the passenger compartment 4 when the shutter 10 is in the closed position.

The screen 12 is able to generate light. Preferably, the screen 12 is able to generate images, in particular static images and/or animated images. The screen 12 includes a matrix of pixels, controllable so as to display images.

The screen 12 may adopt an active display state and an inactive state.

In the active state, all or some of the pixels are activated, so as to display information such as maps for GPS, information on the operation of the vehicle, the operation of the air conditioning system, the operation of the vehicle's music system, etc. In the inactive state, the screen 12 does not display any image and is completely transparent.

The screen 12 itself is flexible to allow the shutter 10 to be flexible as a whole.

The elements connecting the screen 12 to the control device 13 and to a power supply system of the screen 12 are advantageously positioned on at least one hidden edge of the shutter 10, such as the rear transverse edge 40.

In one embodiment, the screen 12 is a screen with organic light-emitting diodes (OLED). Such screens 12 are known for being thin, flexible and transparent when inactive.

Advantageously, the screen 12 is a touch-sensitive screen. For example, the screen 12 comprises transparent capacitive antennas making it possible to detect when the user touches the screen 12.

The screen 12 is touch-sensitive and can be used as a man-machine interface. The screen 12 and the control device 13 then allow the passengers of the vehicle to send commands to other systems of the vehicle and to receive information via the screen 12.

In one example, the control device 13 establishes a mirror link between the screen 12 and an electronic device situated inside the storage space 8 such that the screen 12 displays the contents of the electronic device.

In one example, the screen 12 displays the charging state of an electronic device installed on a wireless charger, for example inside the storage space 8.

The protective layer 14 covers the screen 12. The protective layer 14 defines the first face 30 of the shutter 10.

When the screen 12 is a touch-sensitive screen, the passengers of the vehicle can activate the commands of the screen 12 by touching the protective layer 14.

The protective layer 14 withstands the usage conditions of the shutter 10. It is flexible to allow the shutter 10 to be flexible as a whole. It serves to protect the shutter, for example, against humidity in the passenger compartment or ultraviolet rays that may cause premature aging of the shutter 10, in particular of the screen.

The protective layer 14 is transparent. Likewise, it does not deteriorate the quality of the images generated on the screen 12. For example, the protective layer 14 is made from glass, transparent plastic such as polycarbonate (PC) or polymethyl methacrylate (PMMA), or the like.

Furthermore, the shutter 10 comprises transparent adhesive (not shown) inserted between the different layers of the shutter 10 to cause these layers to adhere to one another. The adhesive is advantageously a transparent optical adhesive. The distribution, quantity and quality of the adhesive is such that the light is divided little or uniformly. Thus, the contents of the inner space 8 and/or the images generated on the screen 12 are perceived from the passenger compartment 4 without being affected by optical abnormalities related to the adhesive.

Thus, in the example of FIGS. 1 to 3, adhesive is applied between the screen 12 and the protective layer 14.

In the viewing configuration, the transmission zone 50 is able to allow visible light to pass between the first face 30 and the second face 32 of the shutter 10.

The shutter 10 comprises the transmission zone 50 through which the shutter 10 is able to allow visible light to pass through the shutter 10, when the transmission zone 50 is in the viewing configuration.

The area of the transmission zone 50 is for example greater than 90% of the area of the part 34 of the shutter 10 intended to be visible. Advantageously, the transmission zone 50 covers the entire part 34 of the curtain 10 intended to be visible. In one embodiment, the transmission zone 50 covers the entire surface of the shutter 10. If applicable, the shutter 10 is opaque in the zones complementary to the transmission zone 50.

In the viewing configuration, the transmission zone 50 is able to allow enough visible light to pass through the shutter 10 to make it possible to distinguish objects through the shutter 10, more specifically through the transmission zone 50.

For example, the transmission zone 50 is substantially transparent in the viewing configuration.

The screen 12 extends at least partially in the transmission zone 50. In one embodiment, the screen 12 extends in the transmission zone 50, the contour of the screen 12 substantially coinciding with that of the transmission zone 50.

When the transmission zone 50 is in the viewing configuration, the pixels of the screen 12 are deactivated in the transmission zone 50 and the screen 12 is transparent in the transmission zone 50.

This makes it possible to distinguish objects through the shutter 10 clearly in the viewing configuration.

Preferably, by illuminating one face of the shutter 10 with a light flow having an initial intensity, it is possible to measure, on the side of the opposite face, a light flow having an intensity comprised between 50% and 100% of the initial intensity, when the transmission zone 50 is in the viewing configuration.

Thus, when the shutter 10 is in the closed position on the storage compartment 6 and in the viewing configuration, it is able to allow enough light to pass to and from the interior space 8, without introducing optical abnormalities, for the objects situated inside the storage compartment 6 to be discernible, when the trim assembly 2 is viewed from the passenger compartment 4.

When the shutter 10 is in the viewing configuration, the contents of the inner space are lit by the lights from the passenger compartment 4 of the vehicle or by a light source positioned inside the storage compartment 6.

In the trim assembly 2, when the shutter 10 is in the viewing configuration, it absorbs less than 50% of the light flow coming from the passenger compartment 4.

In one example, the storage compartment 6 advantageously comprises a light source in the interior space 8 that can be controlled between an illuminated state and an off state. For example, the light source comprises at least one bulb and/or light-emitting diode. For example, the light source is controlled by the control device 13.

In the concealing configuration, the transmission zone 50 does not make it possible to distinguish the objects present in the compartment 6.

In the concealing configuration, the screen 12 generates an image concealing the light coming from the storage space 8. The image is a static image, like a set, or an animated image, like a video, with a light intensity greater than the light intensity transmitted through the transmission zone 50 between the second face 32 and the first face 30 of the shutter 10.

Thus, when the shutter 10 is in the concealing configuration, the shutter 10 performs its role of concealing the compartment 6.

Advantageously, the light source of the compartment 6 switches to the off state when the shutter 10 is in the concealing configuration.

For example, the control device 13 is secured to the shutter 10. The control device 13 can be controlled manually and/or automatically. The control device 13 for example comprises a sensor detecting the position of the shutter, a sensor detecting the stop and/or startup state of the vehicle.

Alternatively or additionally, the control device 13 comprises a manual control button 52. The control button 52 is for example accessible from the passenger compartment 4 of the vehicle. Alternatively or additionally, the control button 52 is on the first face 30 of the shutter 10. When the user wishes to inspect the contents of the compartment 6, he activates the change of configuration using the control button 52. The transmission zone 50 changes configurations.

Figure 4:
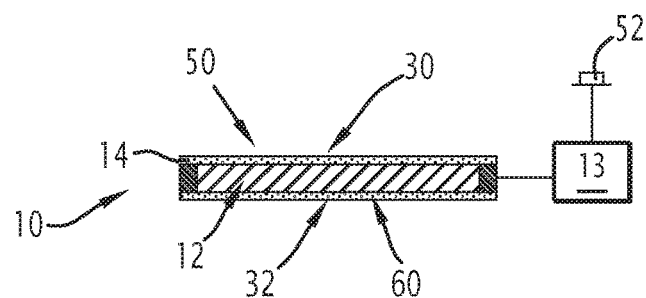
FIG. 4 is a view similar to FIG. 3 of a shutter of a trim assembly according to one alternative.

The alternative shown in FIG. 4 differs from that of FIG. 3 in that the transmission zone 50 also uses adjustable optical transmittance. The transmission zone 50 can be controlled so as to vary its optical transmittance.

The shutter 10 comprises, at least in the transmission zone 50, a layer formed by a film 60 with adjustable optical transmittance. The film 60 can be controlled so as to vary its optical transmittance.

The film 60 defines the second face 32 of the shutter 10. In one alternative, the film 60 is positioned on the opposite side of the screen 12.

The shutter 10 has, at least in the transmission zone 50, a multi-layer structure. The film with adjustable opacity 60 and the screen 12 are superimposed and form two layers of the curtain 10.

As before, a layer of transparent adhesive is inserted between the screen 12 and the film 60 to cause these layers to adhere to one another without introducing any optical abnormalities.

The film 60 is for example a liquid crystal film.

The more the optical transmittance of the film 60 is reduced, the more the opacity of the film 60 is increased and the more the film 60 conceals.

The optical transmittance of the film 60 is adjustable between a minimum optical transmittance and a maximum optical transmittance. When the transmission zone 50 is in the concealing configuration, the optical transmittance of the film 60 is minimal. When the transmission zone 50 is in the viewing configuration, the optical transmittance of the film 60 is maximal.

The optical transmittance of the film 60 varies based on a voltage applied to the film 60. The film 60 is for example connected to the control device 13 controlling the voltage applied to the film 60. The elements connecting the film to a power source of the film 60 or to the control device 13 are advantageously positioned on at least one hidden edge of the shutter 10, such as the rear transverse edge 40.

Advantageously, in the viewing configuration, the film 60 is transparent. The transmittance of the film 60 is high, for example greater than 90%, or even equal to 100%.

Advantageously, in the concealing configuration, the film is completely opaque, i.e., its optical transmittance is substantially zero. Alternatively, in the concealing configuration, the optical transmittance of the film 60 is less than 20%, in particular less than 10%.

Advantageously, the film 60 is kept at its minimum transmittance without applying voltage. The film 60 is for example opaque or translucent without applying voltage, but becomes transparent when voltage is applied. For example, the voltage applied for the film 60 to have its maximum transmittance is 12 V. For such a film 60, simply maintaining the maximum transmittance causes energy consumption.

The film 60 makes it possible to hide the bottom 22 and the interior space 8, when the shutter 10 is in the concealing configuration, whether the screen 12 is inactive or active.

In one example use, the film 60 is kept opaque, while the screen 12 is active. This advantageously makes it possible to improve the contrast of the screen 12.

When the user wishes to inspect the contents of the compartment 6, he activates the change of configuration, for example using the control button 52. The film 60 switches to its maximum transmittance state and the screen 12 switches to the inactive state. Inspecting the contents of the compartment 6 is generally a fairly short operation; the vehicle's battery is therefore stressed very little to keep the film 60 at its minimum opacity.

The present invention proposes a trim assembly 2 making it possible to obtain information about the contents of the storage compartment 6 simply and efficiently, without having to open it.

Furthermore, the trim assembly 2 makes it possible to optimize the inside of a motor vehicle passenger compartment 4 by using the available areas. The shutter 10 of the trim assembly 2 can thus be used for esthetic or informational purposes, in addition to its concealing function.

The invention is not limited to the embodiments and alternatives described above.

Thus, in one alternative, the transmission zone is slightly translucent in the viewing configuration.

In alternatives, the number, order and nature of the layers of the shutter 10, in particular the transmission zone 50, can be different.

Thus, optionally, the shutter 10 further includes a transparent support layer reinforcing it.

Moreover, in one alternative, the shutter 10 has no electroluminescent screen 12, and only the film 60 with adjustable optical transmittance makes it possible to vary the opacity of the transmission zone 50.

The shutter 10 may comprise one or several separate transmission zones 50, the configuration change of which is controlled collectively or individually.

The invention claimed is:

1. A vehicle trim assembly, comprising:
a storage compartment defining a storage space emerging through an opening,
a shutter movable relative to the storage compartment between a closing position, in which the shutter closes off the opening, and an open position, in which the shutter is freed from the opening,
wherein the shutter comprises at least one transmission zone controllable between a viewing configuration, in which the transmission zone allows the visible light to pass through the shutter and makes distinguishing the contents of the storage space through the shutter possible, and a concealing position, in which the transmission zone makes distinguishing the contents of the storage space through the shutter not possible.

2. The vehicle trim assembly according to claim 1, wherein the shutter comprises an electroluminescent screen extending in the transmission zone, the screen being at least partially transparent or translucent when the screen is not generating light.

3. The vehicle trim assembly according to claim 2, wherein the shutter comprises a transparent protective layer covering the screen.

4. The vehicle trim assembly according to claim 2, wherein the screen is a touch-sensitive screen.

5. The vehicle trim assembly according to claim 1, wherein the transmission zone has an adjustable optical transmittance.

6. The vehicle trim assembly according to claim 5, wherein the shutter comprises an adjustable-transmittance film extending in the transmission zone.

7. The vehicle trim assembly according to claim 5, wherein the transmission zone has a higher optical transmittance in the viewing configuration than in the concealing configuration.

8. The vehicle trim assembly according to claim 1, wherein the transmission zone is transparent or translucent in the viewing configuration.

9. The vehicle trim assembly according to claim 1, wherein the transmission zone is opaque in the concealing configuration.

10. The vehicle trim assembly according to claim 1, comprising a control device to control the transmission zone in order to activate the change of configuration, in particular based on actuation of a control button, based on a signal provided by a sensor, or based on both actuation of a control button and a signal provided by a sensor.

* * * * *